US011151432B2

(12) United States Patent
Kozuka

(10) Patent No.: US 11,151,432 B2
(45) Date of Patent: Oct. 19, 2021

(54) INFORMATION PROCESSING APPARATUS AND ACTIVATION METHOD THEREOF

(71) Applicant: CANON KABUSHIKI KAISHA, Tokyo (JP)

(72) Inventor: Yasuhiro Kozuka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/795,108

(22) Filed: Oct. 26, 2017

(65) Prior Publication Data
US 2018/0046887 A1    Feb. 15, 2018

Related U.S. Application Data

(63) Continuation of application No. 14/570,955, filed on Dec. 15, 2014, now Pat. No. 9,830,543.

(30) Foreign Application Priority Data

Dec. 18, 2013    (JP) ................................ 2013-261500

(51) Int. Cl.
*G06K 15/00* (2006.01)
*H04N 1/00* (2006.01)
*G06F 1/3203* (2019.01)

(52) U.S. Cl.
CPC ......... *G06K 15/406* (2013.01); *G06F 1/3203* (2013.01); *H04N 1/00891* (2013.01); *H04N 1/00896* (2013.01); *H04N 2201/0094* (2013.01)

(58) Field of Classification Search
CPC .... G06F 1/3203; G06F 3/1221; G06F 3/1229; G06K 15/4055; G06K 15/406;
(Continued)

(56) References Cited

U.S. PATENT DOCUMENTS

2002/0002648 A1*  1/2002  Kawase ................. G06F 13/26
                                                                 710/260
2009/0310177 A1* 12/2009  Takahashi .......... G03G 15/5004
                                                                 358/1.15
(Continued)

FOREIGN PATENT DOCUMENTS

CN         101206599 A       6/2008
CN         101515236 A       8/2009
WO       2012/169560 A1     12/2012

*Primary Examiner* — Nicholas Pachol
(74) *Attorney, Agent, or Firm* — Canon U.S.A., Inc. IP Division

(57) ABSTRACT

An information processing apparatus includes a storage unit configured to store information related to an activation of the information processing apparatus, a control unit configured to perform a control such that, in a case where the information stored in the storage unit relates to a first activation, the information processing apparatus is shifted into a standby state when power is supplied to the information processing apparatus, and in a case where the stored information relates to a second activation, the information processing apparatus is shifted into the standby state when the power is supplied to the information processing apparatus and also a signal input to the control unit is put into a particular state, and a power supply control unit configured to put the signal input to the control unit into the particular state when the information processing apparatus is not shifted into the standby state even when the power is supplied.

22 Claims, 10 Drawing Sheets

(58) Field of Classification Search
CPC ........... H04N 1/00891; H04N 1/00896; H04N 1/00885–1/00907; H04N 2201/0094
See application file for complete search history.

(56) References Cited

U.S. PATENT DOCUMENTS

| | | | |
|---|---|---|---|
| 2010/0118331 A1* | 5/2010 | Murata | G03G 15/5004 358/1.15 |
| 2011/0271131 A1* | 11/2011 | Lefebvre | G06F 1/3287 713/323 |
| 2012/0127517 A1* | 5/2012 | Oh | G03G 15/5004 358/1.15 |
| 2012/0331279 A1 | 12/2012 | Matsubara | |
| 2013/0198539 A1* | 8/2013 | Furuya | G06F 1/24 713/310 |
| 2014/0025974 A1* | 1/2014 | Suwabe | G06F 1/3234 713/323 |

* cited by examiner

FIG. 5

|  | | STATE SIGNAL C | |
|---|---|---|---|
|  | | Hi | Low |
| STATE SIGNAL D | Hi | STANDBY STATE (S1) | |
|  | Low | SLEEP STATE (S3) | POWER SUPPLY OFF STATE (G3)/ SOFT OFF STATE (G5) |

INFORMATION PROCESSING APPARATUS AND ACTIVATION METHOD THEREOF

CROSS-REFERENCE TO RELATED APPLICATIONS

This application is a continuation of U.S. patent application Ser. No. 14/570,955 filed Dec. 15, 2014, which claims the benefit of Japanese Patent Application No. 2013-261500 filed Dec. 18, 2013, all of which are hereby incorporated by reference herein in their entirety.

BACKGROUND OF THE INVENTION

Field of the Invention

The present invention relates to a technology of automatically activating an information processing apparatus even in a case where setting information that is referred to when the information processing apparatus is activated is rewritten.

Description of the Related Art

Up to now, an information processing apparatus such as a personal computer includes a memory for holding basic setting information for controlling the information processing apparatus (information of an initial position address of a ROM which is read out at the time of the activation, information related to an activation of the information processing apparatus, information indicating the time, and the like). The memory that stores this setting information is a complementary MOS (CMOS) and holds the memory of the setting information by power supplied from a battery. Hereinafter, the above-described memory is mentioned as "activation internal memory". The information related to the activation of the information processing apparatus stored in the activation internal memory indicates one of the following modes;

"AUTO" mode to automatically activate up to a standby state when power is supplied from an alternating current (AC) power supply.

"SOFT OFF" mode to stand by for the activation until a soft switch is pressed by a user even after the power is supplied from the AC power supply.

A general-use processor used in the information processing apparatus such as the personal computer can store one of information indicating the "SOFT OFF" mode and information indicating the "AUTO" mode in accordance with a selection made by the user in order to correspond to a use environment of the user. In a case where the information indicating the "AUTO" mode is stored, when the power is supplied to the information processing apparatus from the AC power supply, the information processing apparatus immediately starts the activation. On the other hand, in a case where the information indicating the "SOFT OFF" mode is stored, when the power is supplied to the information processing apparatus from the AC power supply, a waiting state for the press of the soft switch is established. At this time, when the soft switch is pressed by the user, the information processing apparatus starts the activation (see Japanese Patent Laid-Open No. 2000-148633). It is noted that the activation is a series of processings performed from the supply of the power from the AC power supply until the information processing apparatus is put into a usable state and includes an activation of application and the like.

A general-use processor that can store both of the information indicating the "SOFT OFF" mode and the information indicating the "AUTO" mode as described above is also used in a printing apparatus.

However, a printing apparatus in which the power supply is hardly turned off, in preparation for FAX reception or the like, may not be provided with the soft switch for switching on/off the power supply in accordance with operation by a user in some cases. For this reason, in the printing apparatus that is not provided with the soft switch, the activation internal memory stores the information indicating the "AUTO" mode as the information related to the activation so that the printing apparatus is automatically activated up to the standby state when the power is supplied from the AC power supply.

Incidentally, the setting information stored in the activation internal memory may be rewritten in some cases because of a foreign element such as static charge or cosmic ray. In the above-described printing apparatus, if the information related to the activation which is stored in the activation internal memory is rewritten from the information indicating the "AUTO" mode to the information indicating the "SOFT OFF" mode, even when the power is supplied from the AC power supply, the printing apparatus is not activated. This is because, when the information related to the activation which is stored in the activation internal memory turns to the "SOFT OFF" mode, the printing apparatus that has received the power supplied from the AC power supply is put into the waiting state for the press of the soft switch, but the printing apparatus is not provided with the soft switch.

SUMMARY OF THE INVENTION

In view of the above, the present invention aims at providing an information processing apparatus in which, in a case where setting information that is referred to when the information processing apparatus is activated is rewritten, the information processing apparatus can be automatically activated.

An information processing apparatus according to one embodiment of the present invention includes a storage unit configured to store information related to an activation of the information processing apparatus corresponding to information that is referred to in a case where power is supplied to the information processing, a control unit configured to perform a control such that, in a case where the information stored in the storage unit relates to a first activation, the information processing apparatus is shifted into a standby state when the power is supplied to the information processing apparatus, and in a case where the information stored in the storage unit relates to a second activation, the information processing apparatus is shifted into the standby state when the power is supplied to the information processing apparatus and also a signal input to the control unit is put into a particular state, and a power supply control unit configured to put the signal input to the control unit into the particular state in a case where the information processing apparatus is not shifted into the standby state even when the power is supplied to the information processing apparatus.

Further preferred features of the present invention will become apparent from the following description of exemplary embodiments with reference to the attached drawings.

BRIEF DESCRIPTION OF THE DRAWINGS

FIG. 5 illustrates a relationship between logics of state signals and a state of the image forming apparatus.

DESCRIPTION OF THE EMBODIMENTS

Hereinafter, exemplary embodiments for carrying out the present invention will be described with reference to the drawings.

First Exemplary Embodiment

Figure 1:
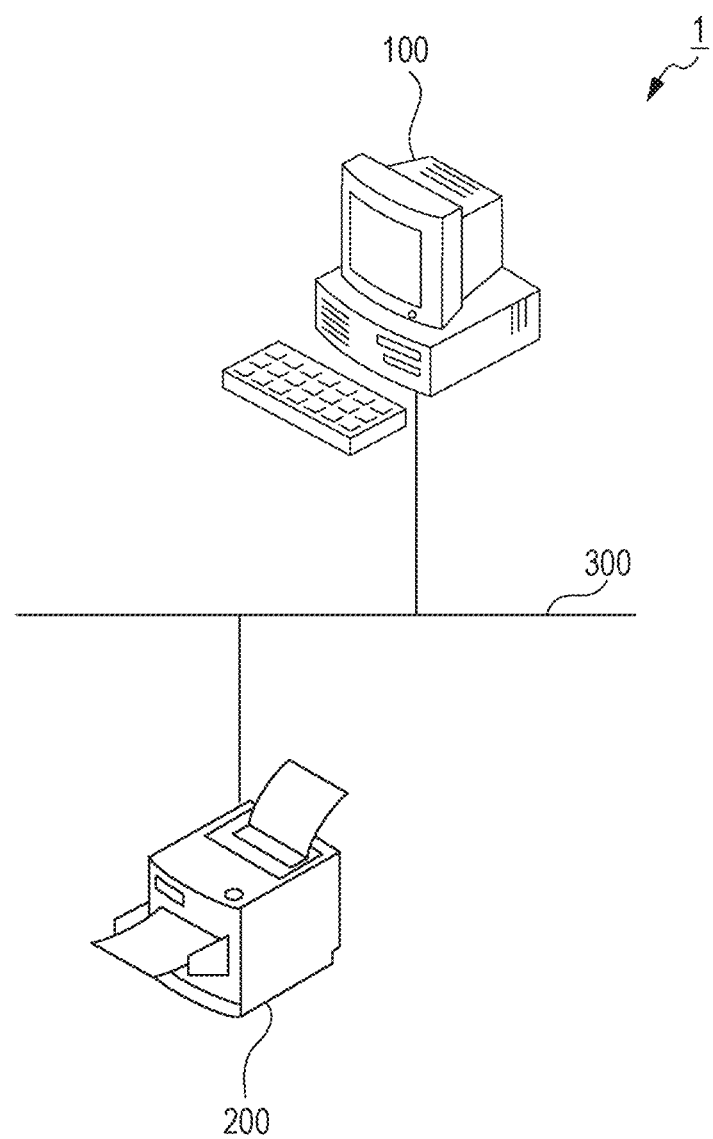
FIG. 1 illustrates a printing system provided with a client PC and an image forming apparatus.

FIG. 1 illustrates an entire configuration of a printing system including an image forming apparatus according to a first exemplary embodiment of the present invention.

A printing system 1 is provided with a client PC 100 and an image forming apparatus 200. In the printing system 1, the client PC 100 performs a communication with the image forming apparatus 200 via a network 300. The network 300 may be a wired network such as a LAN or a USB or a wireless network such as a wireless LAN.

Figure 2:
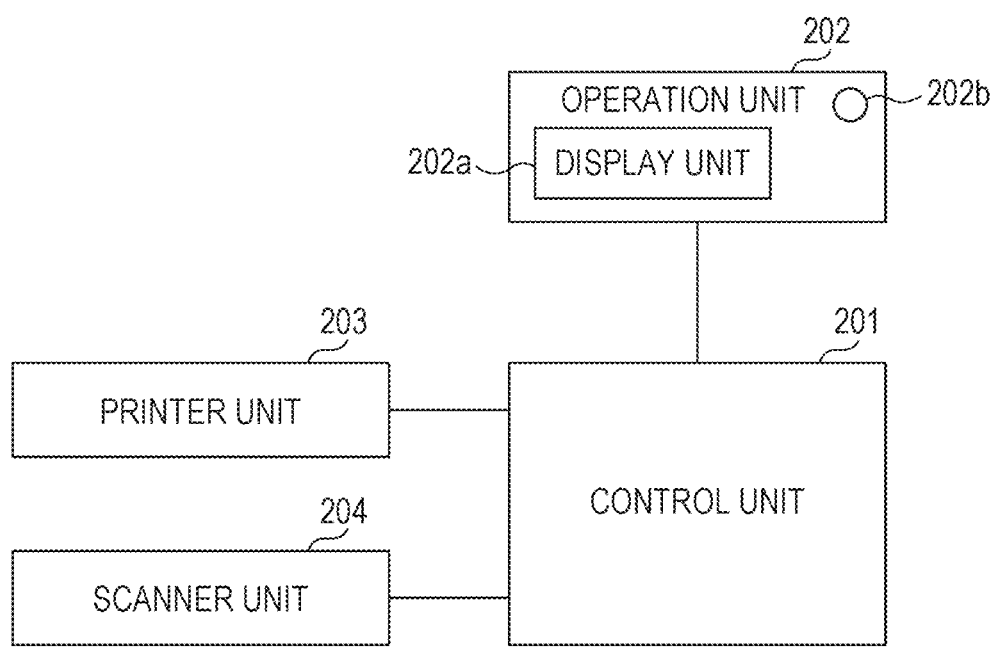
FIG. 2 is a hardware block diagram illustrating an outline of an internal configuration of the image forming apparatus.

FIG. 2 is a hardware block diagram of the image forming apparatus 200.

The image forming apparatus 200 includes a control unit 201, an operation unit 202, a printer unit 203, and a scanner unit 204. The control unit 201 is configured to control the respective units of the image forming apparatus 200 (the operation unit 202, the printer unit 203, and the scanner unit 204). The operation unit 202 is provided with a hard key for a user to perform various operations and a display panel 202a for displaying an image or a text. The above-described hard key includes a power saving key 202b for shifting the image forming apparatus 200 from a standby state into a sleep state where power consumption is lower than the standby state or shifting the image forming apparatus 200 from the sleep state into the standby state. The respective power states such as the standby state and the sleep state mentioned above will be described below. The printer unit 203 is configured to print an image on which image processing has been performed by the control unit 201 on a sheet. The scanner unit 204 generates image data by reading an image on an original. The image data is input to the control unit 201.

Figure 3:
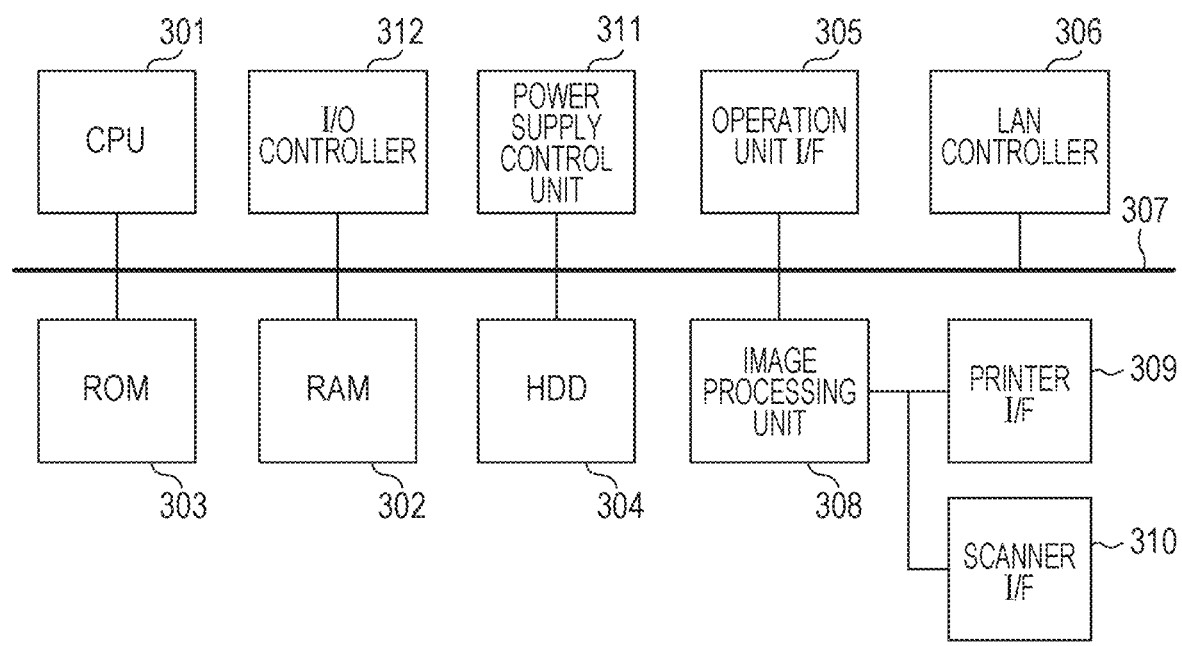
FIG. 3 is a hardware block diagram illustrating details of a control unit illustrated in FIG. 2.

FIG. 3 is a hardware block diagram of the control unit 201.

The control unit 201 includes a CPU 301, a RAM 302, a ROM 303, and a hard disc drive (HDD) 304. The control unit 201 also includes an operation unit I/F 305, a LAN controller 306, a system bus 307, an image processing unit 308, a printer I/F 309, a scanner I/F 310, a power supply control unit 311, and an I/O controller 312. In FIG. 3, the CPU 301 and the I/O controller 312 are illustrated separately, but each of the CPU 301 and the I/O controller 312 may be an individual IC chip, or a single IC chip including the CPU 301 and the I/O controller 312 may be used.

The CPU 301 controls accesses with various devices connected to the CPU 301 on the basis of a control program or the like stored in the ROM 303. The RAM 302 is a system work memory for the CPU 301 to operate. The RAM 302 is configured to temporarily store image data on which image processing is performed by the image processing unit 308. The HDD 304 can store system software and the image data. The operation unit I/F 305 is an interface unit for connecting the system bus 307 to the operation unit 202. The operation unit I/F 305 receives the image data to be displayed on the operation unit 202 from the system bus 307. The operation unit I/F 305 also outputs information input from the user via the operation unit 202 to the system bus 307. The LAN controller 306 is connected between the network 300 and the system bus 307. The LAN controller 306 is configured to control input and output of information between the client PC 100 and the image forming apparatus 200 which are connected via the network 300. The image processing unit 308 is configured to perform the image processing on the input image data. Specifically, the image forming apparatus 200 reads out the image data stored in the RAM 302 and performs image processing such as enlarging processing, reducing processing, and color adjustment processing on the read image data. The image data on which the image processing has been performed by the image processing unit 308 is output to the printer unit 203 via the scanner I/F 310. An image of an original scanned by the scanner unit 204 is output to the image processing unit 308 via the printer I/F 309. In a case where copying of the original is performed, the image of the original is read by the scanner unit 204 and output to the image processing unit 308. Subsequently, the image processing unit 308 performs the image processing on the image data input to the image processing unit 308, and thereafter the image data is output to the printer unit 203 via the scanner I/F 310. In addition, in a case where the image of the original read by the scanner unit 204 is saved, the image of the original is read by the scanner unit 204 and output to the image processing unit 308. Subsequently, the image processing unit 308 performs the image processing on the image data input to the image processing unit 308, and thereafter the image data is stored in the HDD 304. The power supply control unit 311 and the I/O controller 312 will be described in detail below.

Figure 4:
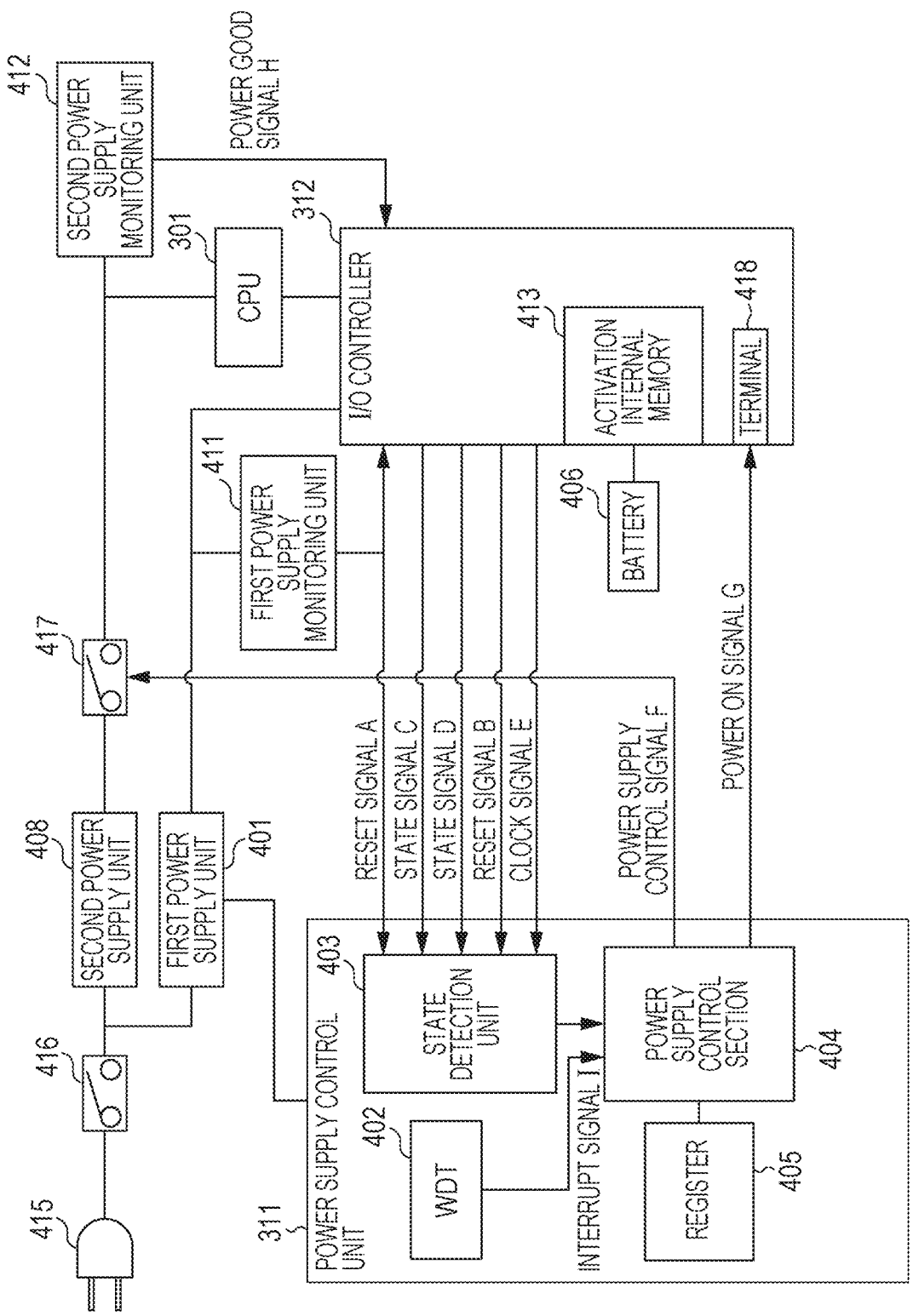
FIG. 4 is a power supply circuit diagram of the image forming apparatus.

FIG. 4 is a power supply circuit diagram of the image forming apparatus 200.

A power supply plug 415 is designed to input the AC power supply to the image forming apparatus 200. A first power supply unit 401 and a second power supply unit 408 convert the AC power supply input via the power supply plug 415 into direct current (DC) power supply. The first power supply unit 401 generates, for example, the DC power supply at 5.0 V. In addition, the second power supply unit 408 generates, for example, the DC power supply at 12.0 V. A power supply switch 416 is arranged between the power supply plug 415 and the first power supply unit 401 and the second power supply unit 408. The power supply switch 416 is put into an ON state or an OFF state in accordance with the user operation. In addition, a relay 417 is provided between the second power supply unit 408 and a second power supply system device that receives the power supplied from the second power supply unit 408. The relay 417 is put into the ON state or the OFF state on the basis of a logic of the power supply control signal F (Hi level, Low level) output from the power supply control unit 311. The above-described second power supply system device corresponds to the CPU 301, the HDD 304, the image processing unit 308, the scanner unit 204, the printer unit 203, and the like.

A first power supply monitoring unit 411 monitors a voltage value supplied from the first power supply unit 401. Subsequently, in a case where the voltage value monitored by the first power supply monitoring unit 411 becomes higher than or equal to a predetermined value, the first power supply monitoring unit 411 sets a reset signal A input to a first power supply system device supplied with the power from the first power supply unit 401 to the Hi level. Accordingly, the reset of the first power supply system device is cancelled. The first power supply system device corresponds to the power supply control unit 311, the I/O controller 312, the RAM 302, the ROM 303, the LAN controller 306, and the like. In addition, a second power supply monitoring unit 412 monitors a voltage value supplied from the second power supply unit 408. Subsequently, in a case where the voltage value monitored by the second power supply monitoring unit 412 becomes higher than or equal to a predetermined value, the second power supply monitoring unit 412 sets a power good signal H input to the I/O controller 312 to the Hi level. When the power good signal H turns to the Hi level, the I/O controller 312 sets a reset signal B input to the power supply control unit 311 to the Hi level. Accordingly, the reset of the second power supply system device is cancelled. It is noted that the reset signal B is also input to the power supply control unit 311.

A battery 406 supplies power to an activation internal memory 413. While the power is supplied from the battery 406, information stored in the activation internal memory 413 is not cleared.

With Regard to Details of the Power Supply Control Unit 311

The power supply control unit 311 controls the power supplied to the respective units of the image forming apparatus 200. The power supply control unit 311 according to the present exemplary embodiment is a hardware logic circuit and is composed of a complex programmable logic device (CPLD). It is noted that the power supply control unit 311 may be a processor that performs information processing in accordance with software. The power supply control unit 311 includes a watchdog timer 402, a state detection unit 403, a power supply control section 404, and a register 405.

The watchdog timer 402 is a timer for counting a predetermined time and sets an interrupt signal I to the Hi level when the counting of the predetermined time is completed. After the reset of the power supply control unit 311 is cancelled, the watchdog timer 402 sets the interrupt signal I to the Hi level in a case where states of a state signal C and a state signal D which will be described below are not changed before the predetermined time elapses. The interrupt signal I is input from the watchdog timer 402 to the power supply control section 404.

The state detection unit 403 is configured to detect a power state of the image forming apparatus 200. The state detection unit 403 detects the power state of the image forming apparatus 200 on the basis of states of various input signals. Specifically, the reset signal A, the reset signal B, the state signal C, the state signal D, and a clock signal E are input to the state detection unit 403. The reset signal A is a signal for cancelling the reset of the first power supply system device. The reset signal B is a signal for cancelling the reset of the second power supply system device. The state signal C turns to the Hi level in a case where the image forming apparatus 200 is shifted from a power supply off state (G3) into the sleep state (S3). The state signal D turns to the Hi level in a case where the image forming apparatus 200 is shifted from the sleep state (S3) into the standby state (S1). The clock signal E is a rectangular signal output from a crystal oscillator that is not illustrated in the drawing in a case where the power is supplied from the first power supply unit 401 to the I/O controller 312.

It is noted that S1, S3, and G3 described above and S5 that will be described below are states defined by the Advanced Configuration and Power Interface (ACPI) standard. The respective power states will be described below. It is also noted that S1 of the image forming apparatus 200 may be S0.

The power supply control section 404 is configured to output the respective signals for performing the power control of the image forming apparatus 200. Specifically, the power supply control section 404 controls a power supply control signal F for setting the relay 417 that switches the power supply to the second power supply system device to the ON state or the OFF state. When the power supply control signal F turns to the Hi level, the relay 417 is put into the ON state, and the power is supplied from the second power supply unit 408 to the second power supply system device. The power supply control section 404 also controls a power on signal G for shifting the image forming apparatus 200 remaining in the soft off state (S5) into the standby state. The power supply control section 404 can set the power on signal G input to a power button terminal 418 of the I/O controller 312 to the Low level (particular state). The power on signal G is open-drain output from the power supply control section 404 and is set to the Hi level in a normal circumstance since the power button terminal 418 is internally pulled up. The normal circumstance refers to a case where the information related to the activation stored in the activation internal memory 413 indicates the "AUTO" mode.

The register 405 holds information indicating that the power on signal G is controlled.

With Regard to Details of the I/O Controller 312

The I/O controller 312 is a general-use processor also used in a personal computer or the like. The I/O controller 312 includes the activation internal memory 413. The activation internal memory 413 holds basic setting information for controlling the image forming apparatus 200. The setting information includes information of an initial position address of the ROM 303 read out by the CPU 301 at the time of the activation of the image forming apparatus 200, information related to the activation of the image forming apparatus 200, information indicating the time, and the like. The information related to the activation of the image forming apparatus 200 indicates one of the "AUTO" mode to automatically activate up to the standby state when the power is supplied and the "SOFT OFF" mode to stand by for the activation until the soft switch is pressed by the user even when the power is supplied. In the image forming apparatus 200 that is not provided with the soft switch according to the present exemplary embodiment, the information related to the activation indicates the "AUTO" mode. That is, when the power supply plug 415 is connected to the AC power supply, the image forming apparatus 200 automatically returns up to the standby state. The activation internal memory 413 is a memory that holds information by the power from the battery and is, for example, a CMOS.

The I/O controller 312 corresponding to a general-use processor provided in the image forming apparatus 200 according to the present exemplary embodiment is provided with the power button terminal 418. The power on signal G is input to the power button terminal 418 from the power supply control unit 311. The power button terminal 418 is a terminal prepared to cancel the waiting state for the press of the soft switch provided in the personal computer. That is, the I/O controller 312 restricts the image forming apparatus 200 to be put into the standby state (S1) until the power on signal G input to the power button terminal 418 turns to the Low level.

The I/O controller 312 functions as a signal output unit configured to output the reset signal B, the state signal C, the state signal D, and the clock signal E to the power supply control unit 311.

Next, a relationship between the logics of the state signal C and the state signal D and the power state of the image forming apparatus 200 will be described with reference to FIG. 5. As illustrated in FIG. 5, in a case where both the state signal C and the state signal D are at the Low level, the image forming apparatus 200 is in the power supply off state (G3). It is however noted that even in a case where both the state signals C and D are at the Low level, if the information related to the activation which is stored in the activation internal memory 413 is the information indicating the "SOFT OFF" mode, the image forming apparatus 200 may turn to the soft off state (S5) in some cases. In a case where the state signal C is at the Hi level and also the state signal D is at the Low level, the image forming apparatus 200 is in the sleep state (S3). In a case where the state signal C and the state signal D at the Hi level, the image forming apparatus 200 is in the standby state (S1).

With Regard to State Transition of the Image Forming Apparatus

Figure 6:
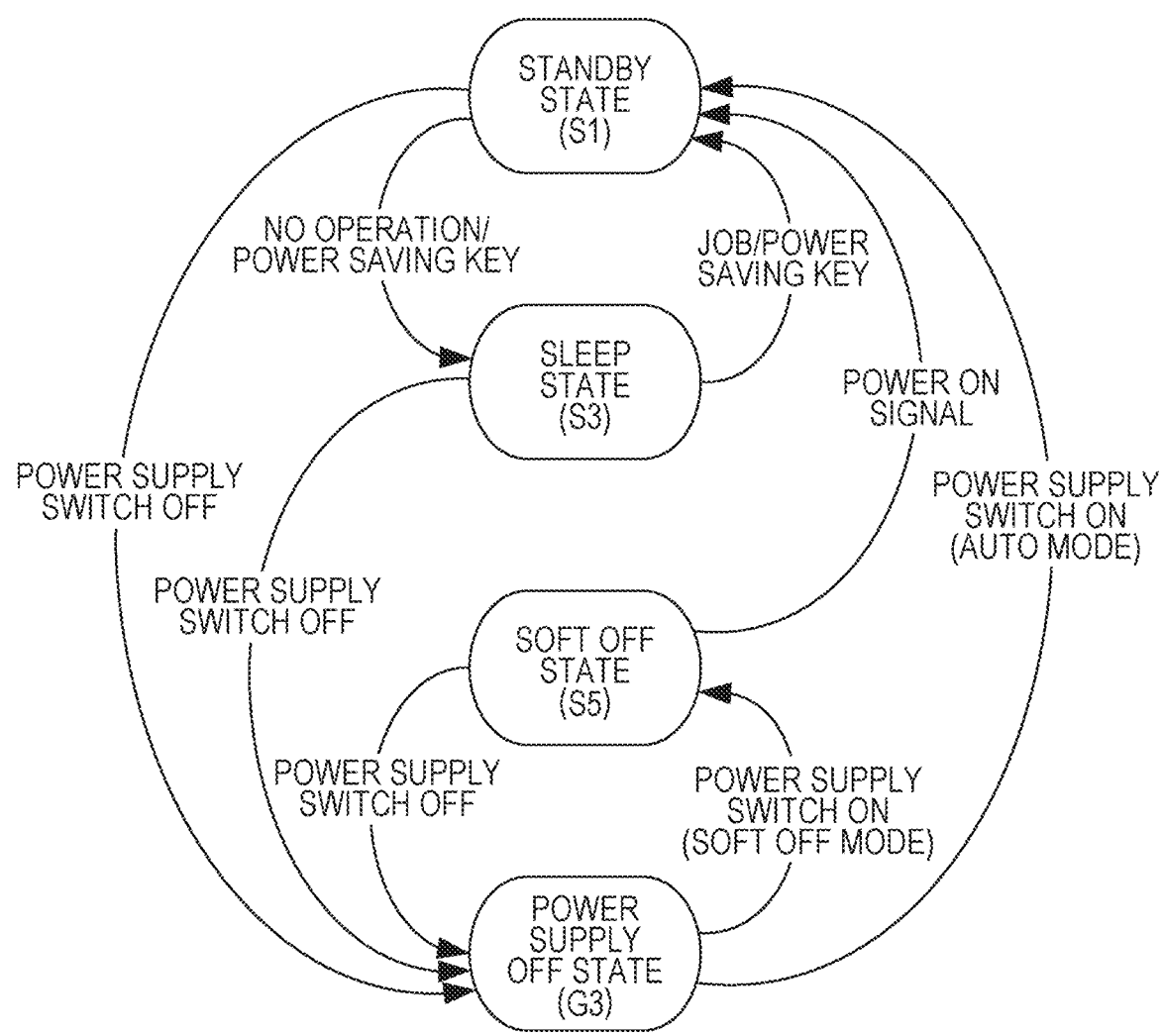
FIG. 6 is a state transition diagram of the image forming apparatus.

FIG. 6 is a state transition diagram of the image forming apparatus 200.

The image forming apparatus 200 is put into one of the power supply off state (G3), the soft off state (S5), the sleep state (S3), and the standby state (S1). It is noted that the image forming apparatus 200 may be put into a state other than the above-described states (for example, an operating state (S0) (printing in execution, scanning in execution, or the like) or a hibernation state (S4)).

The power supply off state (G3) is a state in which the power supply is mechanically off. Specifically, in a case where the power supply switch 416 is in the OFF state, the image forming apparatus 200 is the power supply off state (G3). The power supply off state (G3) corresponds to a state in which the power is not supplied to any parts of the image forming apparatus 200 via the power supply plug 415.

The soft off state (S5) is a state in which only the power used for activating the image forming apparatus 200 is supplied and corresponds to the waiting state for the press of the soft switch that is not provided in the image forming apparatus 200. In the image forming apparatus 200, specifically, according to an activation method stored in the activation internal memory 413, a state of waiting for the power supply switch 416 to turn to the ON state and for the power on signal G input to the power button terminal 418 to turn to the Low level is established.

The sleep state (S3) is a state in which the RAM 302 where the program in execution is expanded is turned on, and the power is supplied to the part used for returning to the standby state (S1). In a case where the operation unit 202 is operated by the user or a job is received from the outside, since the processing can be started by using the program already expanded in the RAM 302, the sleep state (S3) promptly returns to the standby state (S1).

The standby state (S1) is a state shifted from the operating state (S0) when the execution of the printing or the scanning is completed. The standby state (S1) corresponds to a state in which the power is supplied to the first power supply system device and the second power supply system device via the power supply plug 415.

In a case where the information related to the activation which is stored in the activation internal memory 413 indicates the "SOFT OFF" mode, when the power supply switch 416 is put into the ON state by the user in the power supply off state (G3), the image forming apparatus 200 is shifted into the soft off state (S5). On the other hand, in a case where the information related to the activation which is stored in the activation internal memory 413 indicates the "AUTO" mode, when the power supply switch 416 is put into the ON state by the user in the power supply off state (G3), the image forming apparatus 200 is shifted into the standby state (S1).

When the power supply control unit 311 sets the power on signal G input to the power button terminal 418 to the Low level in the soft off state (S5), the image forming apparatus 200 is shifted into the standby state (S1).

In a case where no operation is performed by the user and the predetermined time elapses or a case where no job is received via the network and the predetermined time elapses in the standby state (S1), the image forming apparatus 200 is shifted into the sleep state (S3).

In a case where the operation is performed by the user or a case where the job is received via the network in the sleep state (S3), the image forming apparatus 200 is shifted into the standby state (S1).

When the power supply switch 416 is put into the OFF state by the user in the soft off state (S5), the sleep state (S3), and the standby state (S1), the image forming apparatus 200 is shifted into the power supply off state (G3).

Figure 7:
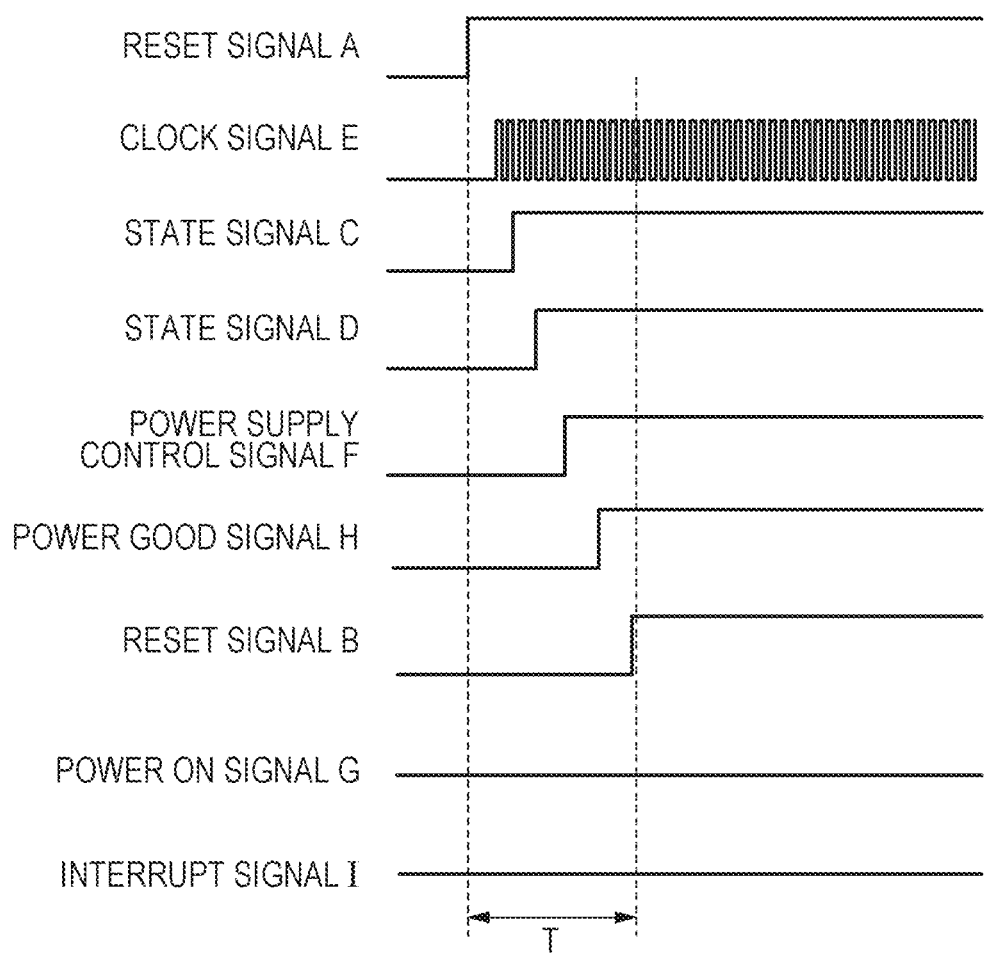
FIG. 7 is a timing chart for signals input to and output from a power supply control unit in a case where information related to an activation indicates an "AUTO" mode.
Figure 8:
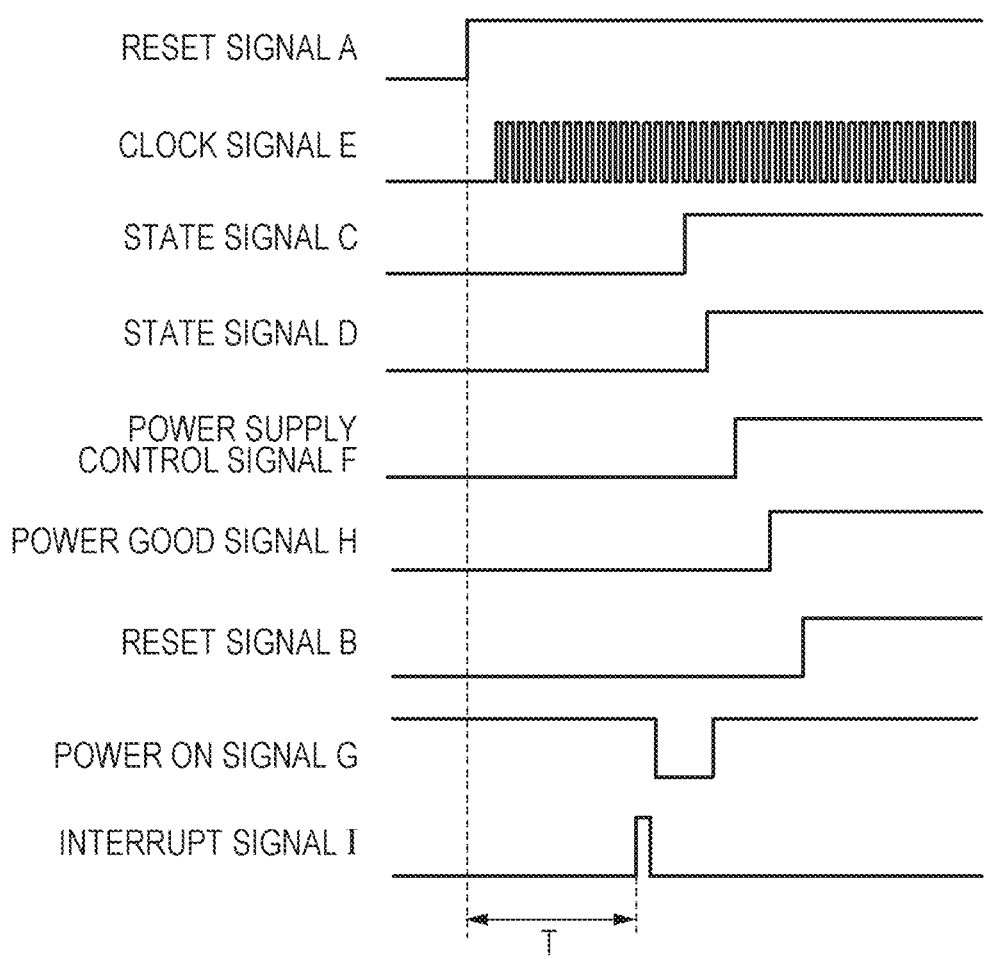
FIG. 8 is a timing chart for the signals input to and output from the power supply control unit in a case where the information related to the activation indicates a "SOFT OFF" mode.

FIG. 7 and FIG. 8 are timing charts for the above-described respective signals (the reset signal A, the reset signal B, the state signal C, the state signal D, the clock signal E, the power supply control signal F, the power on signal G, the power good signal H, and the interrupt signal I).

FIG. 7 is the timing chart for the respective signals in a case where the information related to the activation which is stored in the activation internal memory 413 indicates the "AUTO" mode. The information related to the activation which is stored in the activation internal memory 413 is normally set as the "AUTO" mode.

When the power supply switch 416 is put into the ON state by the user operation, the power is supplied from the first power supply unit 401 to the power supply control unit 311, and the I/O controller 312. When the first power supply monitoring unit 411 detects that the voltage supplied from the first power supply unit 401 becomes higher than or equal to the predetermined value, the first power supply monitoring unit 411 sets the reset signal A to the Hi level. When the reset signal A turns to the Hi level, the watchdog timer 402 starts the counting of the timer (a predetermined time T). After the reset signal A turns to the Hi level, an oscillator (not illustrated) of the I/O controller 312 oscillates the clock signal E at a predetermined oscillation frequency. Subsequently, the I/O controller 312 refers to the information related to the activation which is stored in the activation internal memory 413. In a case where the referred information related to the activation indicates the "AUTO" mode, the activation processing is continuously executed. Subsequently, after the state signal C is set to the Hi level, the I/O controller 312 sets the state signal D to the Hi level. When the state signal D turns to the Hi level, the watchdog timer 402 stops the counting of the timer (the predetermined time T).

When it is detected that the state signal D turns to the Hi level, the state detection unit 403 notifies the power supply control section 404 that the state signal D turns to the Hi level. The power supply control section 404 that has received the notification sets the power supply control signal F to the Hi level and puts the relay 417 into the ON state. Accordingly, the power is supplied from the second power supply unit 408 to the second power supply system device such as the I/O controller 312. The level of the voltage supplied from the second power supply unit 408 is monitored by the second power supply monitoring unit 412. When the voltage monitored by the second power supply monitoring unit 412 becomes higher than or equal to the predetermined value, the second power supply monitoring unit 412 sets the power good signal H to the Hi level. When the power good signal H turns to the Hi level, the I/O controller 312 sets the reset signal B to the Hi level. Accordingly, the reset of the second power supply system device is cancelled, and reading of the software for controlling the operation of the second power supply system device is started.

FIG. 8 is the timing chart for the respective signals in a case where the information related to the activation which is stored in the activation internal memory 413 indicates the "SOFT OFF" mode.

In the image forming apparatus 200 according to the present exemplary embodiment, the information related to the activation which is stored in the activation internal memory 413 indicates the "AUTO" mode. However, the information related to the activation may be rewritten into the information indicating the "SOFT OFF" mode in some cases because of a foreign element. If this information related to the activation is rewritten, even when the user sets the power supply switch 416 to the ON state from the power supply off state (G3), the image forming apparatus 200 remains in the waiting state for the press of the soft switch by the user (the soft off state (S5)). However, the image forming apparatus 200 according to the present exemplary embodiment is different from the personal computer or the like and does not includes the soft switch operated by the user for setting the power on signal G input to the power button terminal 418 to the Low level. Therefore, in a case where the information related to the activation which is stored in the activation internal memory 413 is rewritten into the information indicating the "SOFT OFF" mode, the image forming apparatus 200 that does not include the soft switch remains in the soft off state (S5). In view of the above, according to the present exemplary embodiment, the power supply control unit 311 determines that the information related to the activation which is stored in the activation internal memory 413 is rewritten and sets the power on signal G input to the power button terminal 418 of the I/O controller 312 to the Low level. Accordingly, the image forming apparatus 200 is released from the soft off state (S5) and returns to the standby state (S1). Hereinafter, this configuration will be described in detail.

When the power supply switch 416 is put into the ON state by the user operation, the power is supplied from the first power supply unit 401 to the power supply control unit 311 and the I/O controller 312. When the first power supply monitoring unit 411 detects that the voltage supplied from the first power supply unit 401 becomes higher than or equal to the predetermined value, the first power supply monitoring unit 411 sets the reset signal A to the Hi level. When the reset signal A turns to the Hi level, the watchdog timer 402 starts the counting of the timer (the predetermined time T). After the reset signal A turns to the Hi level, the I/O controller 312 outputs the clock signal E at the predetermined oscillation frequency. Subsequently, the I/O controller 312 refers to the information related to the activation which is stored in the activation internal memory 413. In a case where the referred information related to the activation indicates the "SOFT OFF" mode, the I/O controller 312 stays in the standby state until the power on signal G input to the power button terminal 418 turns to the Low level. For that reason, the state signal C and the state signal D remain at the Low level. If the state signal D remains at the Low level, the watchdog timer 402 completes the counting of the timer T. The watchdog timer 402 that has completed the counting of the timer T sets the interrupt signal I to the Hi level. That is the watchdog timer 402 functions as an interrupt signal output unit for the interrupt signal I. According to the present exemplary embodiment, when the interrupt signal I turns to the Hi level, the state detection unit 403 checks the states of the reset signal A, the clock signal E, and the state signal D. When the state signal C is at the Low level irrespective of a situation where the reset signal A is at the Hi level and also the clock signal E is input, the state detection unit 403 determines that the information related to the activation which is stored in the activation internal memory 413 is rewritten into the "SOFT OFF" mode. Subsequently, the state detection unit 403 notifies the power supply control section 404 that the information related to the activation indicates the "SOFT OFF" mode.

When it is notified from the state detection unit 403 that the information related to the activation indicates the "SOFT OFF" mode, the power supply control section 404 sets the power on signal G input to the power button terminal 418 to the Low level. When the power on signal G turns to the Low level, information indicating that the power on signal G turns to the Low level is stored in the register 405. In a case where the power on signal G input to the power button terminal 418 turns to the Low level, the I/O controller 312 that has been in the soft off state (S5) cancels the soft off state (S5). Specifically, when the power on signal G input to the power button terminal 418 turns to the Low level, the I/O controller 312 sets the state signal C and the state signal D to the Hi level. When it is detected that the state signal D turns to the Hi level, the state detection unit 403 notifies the power supply control section 404 of that effect. The power supply control section 404 that has received the notification sets the power supply control signal F to the Hi level and puts the relay 417 into the ON state. Accordingly, the power from the second power supply unit 408 is supplied to the second power supply system device such as the I/O controller 312. The level of the voltage supplied from the second power supply unit 408 is monitored by the second power supply monitoring unit 412. When the voltage monitored by the second power supply monitoring unit 412 becomes higher than or equal to the predetermined value, the second power supply monitoring unit 412 sets the power good signal H to the Hi level. When the power good signal H turns to the Hi level, the I/O controller 312 sets the reset signal B to the Hi level. Accordingly, the reset of the second power supply system device is cancelled, and reading of the software for controlling the operation of the second power supply system is started.

It is noted that, after the power on signal G is set to the Low level, the power supply control section 404 sets the power on signal G back to the Hi level after the predetermined time elapses.

Figure 9:
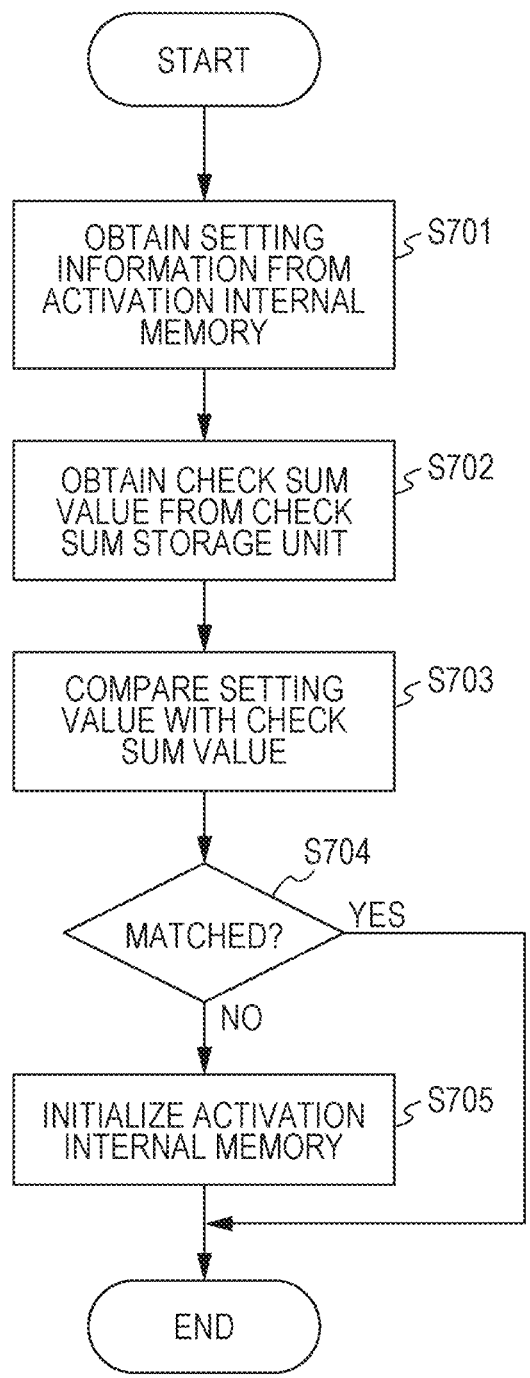
FIG. 9 is a flow chart for reverting the information related to the activation which is stored in the activation internal memory.

FIG. 9 is a flow chart illustrating operation executed by the CPU 301 supplied with the power. The CPU 301 supplied with the power performs checking (check sum) of the setting information stored in the activation internal memory 413.

The CPU 301 obtains the setting information stored in the activation internal memory 413 (S701). The CPU 301 also obtains a check sum value previously stored in a check sum value storage unit (not illustrated) (S702). Subsequently, the setting value obtained in S701 and the check sum value obtained in S702 are compared with each other (S703). As a result of the above-described comparison, in a case where the CPU 301 determines that a difference exists between the setting value and the check sum value (S704: No), initialization (update) of the activation internal memory 413 is performed as a check sum error (S705). Subsequently, after the initialization of the activation internal memory 413 is performed, the CPU 301 clears the value stored in the register 405. Subsequently, the CPU 301 ends the present flow. On the other hand, as a result of the comparison, in a case where the CPU 301 determines that no difference exists between the setting value and the check sum value (S704: Yes), this flow is ended. In this manner, the CPU 301 functions as a rewriting unit configured to rewrite the setting information stored in the activation internal memory 413. According to the present exemplary embodiment, in order to return the rewritten information related to the activation from the information indicating the "SOFT OFF" mode into the information indicating the "AUTO" mode, the initialization of the activation internal memory 413 is performed. As another example, in a case where information indicating that the power on signal G is set to the Hi level is stored in the register 405, only the information related to the activation may be rewritten into the information indicating the "SOFT OFF" mode.

Figure 10:
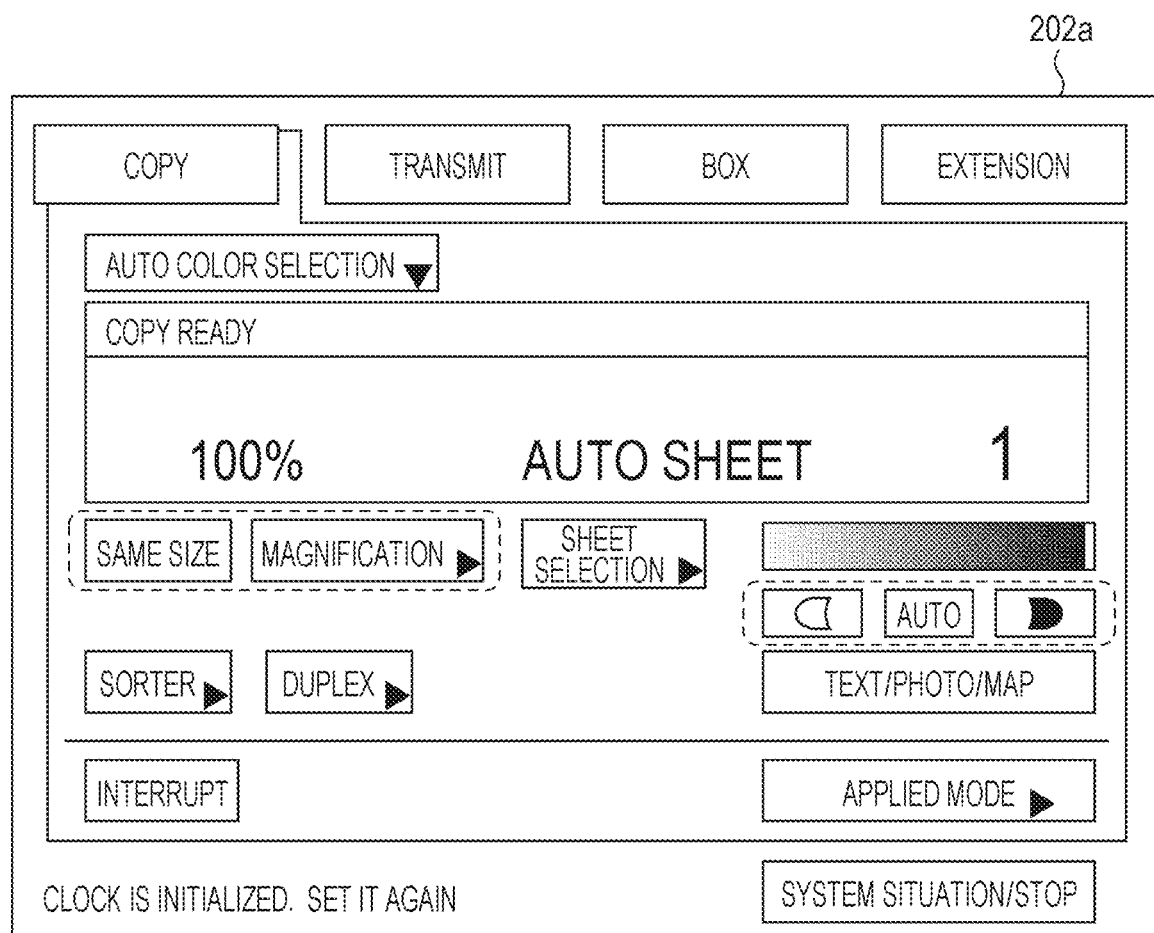
FIG. 10 illustrates a screen displayed on an operation unit.

In a case where time information stored in the activation internal memory 413 is cleared after the above-described check sum is executed, as illustrated in FIG. 10, a message urging the user to set a clock again may be displayed on the display panel 202a of the operation unit 202. In FIG. 10, a message "Clock is initialized. Set it again." is displayed on the display panel 202a.

According to the present exemplary embodiment, if the image forming apparatus 200 is in the soft off state (S5) irrespective of a situation where the reset signal A and the clock signal E are normal and a state in which the I/O controller 312 can be activated is established, the power supply control unit 311 sets the power on signal G to the Low level. Accordingly, the image forming apparatus 200 is automatically activated from the soft off state (S5). In this manner, even when the information related to the activation which is stored in the activation internal memory 413 is rewritten, the image forming apparatus 200 can be automatically activated without the user operation. That is, according to the present exemplary embodiment, even when the information related to the activation is rewritten, the image forming apparatus 200 can be automatically activated without performing operation of short-circuiting a jumper pin.

According to the present exemplary embodiment, since the information related to the activation is reverted into the information indicating the "AUTO" mode by the check sum of FIG. 9, in the next time, in a case where the power supply switch 416 is put into the ON state, the image forming apparatus 200 can be normally shifted into the standby state (S1).

In addition, with the provision of the register 405 indicating that the power on signal G has been controlled, only the information related to the activation which is stored in the activation internal memory 413 can be reverted. Accordingly, it is possible to avoid clearing the other setting information stored in the activation internal memory 413. Accordingly, the user can avoid setting the clock or the like again.

Other Exemplary Embodiments

According to the above-described exemplary embodiment, the example in which the power supply control unit 311 of the hardware logic circuit sets the power on signal G to the Low level has been described, but the power supply control unit 311 may be a processor that performs information processing in accordance with software.

In addition, the logics of the above-described respective signals (the reset signal A, the reset signal B, the state signal C, the state signal D, the power supply control signal F, the power on signal G, the power good signal H, and the interrupt signal I) may be opposite to the logics explained in the above-described exemplary embodiment.

The example in which the power supply control unit 311 checks the states of plurality of signals has been described, but the power supply control unit 311 may check a state of one signal (for example, the state signal C or the state signal D) to control the state of the power on signal G.

The example in which the power supply control unit 311 controls the power on signal G on the basis of the states of the reset signal A, the state signal C, the state signal D, and the clock signal E has been described. According to the present invention, the signal where the state is checked in a case where the power supply control unit 311 controls the power on signal G may be the state signal C or the state signal D alone. In addition, if the power supply control unit 311 checks the reset signal A and the state signal C (or the state signal D), checking on the state of the clock signal E may be avoided. Furthermore, if the power supply control unit 311 checks the state signal C (or the state signal D) and the clock signal E, checking on the reset signal A may be avoided.

The functions illustrated in the flow charts according to the present exemplary embodiment can also be realized when software (program) obtained via a network or various storage media is executed by a processing apparatus (a CPU or a processor) such as a computer or a personal computer.

According to the information processing apparatus of the present invention, even in a case where the setting information that is referred to when the information processing apparatus is activated is rewritten, the information processing apparatus can be automatically activated.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   a memory device in which information indicating a first activation mode or a second activation mode;
   a controller which:
   receives a reset signal output from a reset signal output device;
   refers to the information stored in the memory device based on receiving the reset signal;
   (a) in a case where the referred information is information indicating the first activation mode, shifts into a first state in based on receiving the reset signal, and then shifts from the first state into a second state based on receiving a predetermined on signal causing shifting from the first state into the second state, and
   (b) in a case where the referred information is information indicating the second activation mode, shifts into the second state without input of the predetermined on signal; and
   outputs a predetermined status signal based on shifting into the second state; and
   a device which outputs the predetermined on signal to the controller which has received the reset signal and has not output the predetermined status signal.

2. The information processing apparatus according to claim 1, wherein a predetermined state signal indicates that having a predetermined level indicates that the controller shifts into the second state.

3. The information processing apparatus according to claim 1, wherein the memory device is a complementary metal-oxide-semiconductor (CMOS).

4. The information processing apparatus according to claim 1, wherein the memory device stores, other than the information indicating any one of the first activation mode and the second activation mode, at least one of information indicating time and information indicating an initial position address of a read-only memory (ROM).

5. The information processing apparatus according to claim 1, further comprising a battery configured to supply power to the memory device.

6. The information processing apparatus according to claim 5, wherein the battery is a coin-type battery.

7. The information processing apparatus according to claim 1,
   wherein the device includes a timer,
   wherein the timer starts based on receiving the reset signal having a predetermined level and stops based on that the device receives a predetermined state signal having the predetermined level from the controller after receiving the reset signal having the predetermined level, and wherein the device outputs the on signal to the controller based on the timer.

8. The information processing apparatus according to claim 1, wherein a soft switch configured to be operable by a user and to output the on signal to the controller is not provided to the information processing apparatus.

9. The information processing apparatus according to claim 1, further comprising a processor different from the controller, wherein the processor set the information stored in the memory device to information indicating the second activation mode.

10. The information processing apparatus according to claim 9, wherein the processor determines whether or not the information stored in the memory device is information indicating the second activation mode, and performs the activation mode based on the determination.

11. The information processing apparatus according to claim 10, further comprising a display which displays information indicating that the activation mode has been performed.

12. The information processing apparatus according to claim 1, further comprising a printer which prints an image on a sheet.

13. The information processing apparatus according to claim 1, further comprising a reader which reads an image of a document.

14. The information processing apparatus according to claim 1, wherein the first state of the controller is a state in which the controller waits to receive the predetermined on signal.

15. The information processing apparatus according to claim 1, wherein the device outputs the predetermined on signal to the controller based on a time elapsing without receiving the predetermined status signal after the reset signal.

16. The information processing apparatus according to claim 1, wherein, based on the time elapsing without receiving the predetermined status signal, the device outputs the predetermined on signal to the controller without any operation by a user after the user turns on a power switch of the information processing apparatus.

17. The information processing apparatus according to claim 1, wherein the memory device holding the information is powered by a battery.

18. The information processing apparatus according to claim 1, wherein the controller outputs a plurality of status signals indicating a power state of the information processing apparatus and a clock signal.

19. The information processing apparatus according to claim 1, wherein the information processing apparatus is not provided with a soft switch operated by the user for outputting the predetermined on signal to the controller.

20. The information processing apparatus according to claim 1, further comprising:
    an image forming unit configured to form an image on a sheet.

21. The information processing apparatus according to claim 1, wherein the first state and the second state correspond to an S5 state and an S1 state defined by ACPI (Advanced Configuration and Power Interface), respectively.

22. A method performed by an information processing apparatus comprising:
    receiving, via a controller, a reset signal output from a reset signal output device;
    referring to the information stored in a memory device based on receiving the reset signal;

(a) in a case where the referred-to information is information indicating the first activation mode, shifting into a first state based on receiving the reset signal, and then shifting from the first state into a second state based on receiving a predetermined on signal causing shifting from the first state into the second state, and
(b) in a case where the referred-to information is information indicating the second activation mode, shifting into the second state without input of the predetermined on signal; and outputting a predetermined status signal based on shifting into the second state; and outputting the predetermined on signal to the controller which has received the reset signal and has not output the predetermined status signal.

* * * * *